Nov. 14, 1961  HIROSHI MITO  3,008,396
TELESCOPE HAVING A PHOTOGRAPHIC CAMERA
Filed Aug. 24, 1959
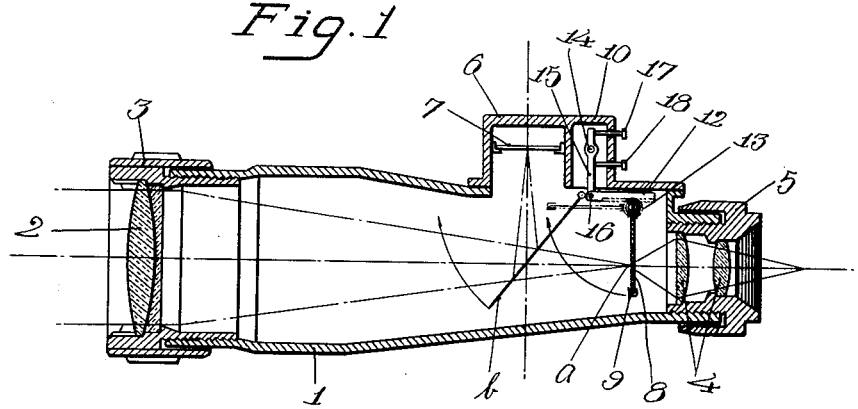
Fig. 1
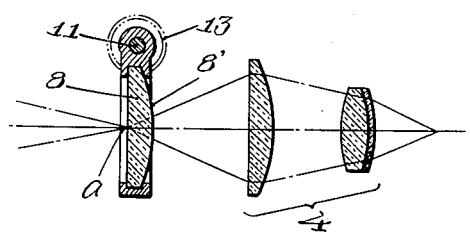
Fig. 4
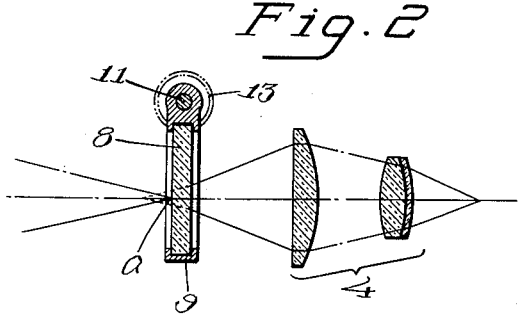
Fig. 2
Fig. 3
INVENTOR.
Hiroshi Mita
BY
Richardson, David & Morton
Attorneys

United States Patent Office 3,008,396
Patented Nov. 14, 1961

3,008,396
TELESCOPE HAVING A PHOTOGRAPHIC
CAMERA
Hiroshi Mito, 27 Iriarai 2-Chome Otaku, Tokyo, Japan
Filed Aug. 24, 1959, Ser. No. 835,694
Claims priority, application Japan Apr. 30, 1959
3 Claims. (Cl. 95—12)

This invention relates to a telescope having a photographic camera.

An object of the present invention is to provide a telescope having a photographic camera having a movable reflector and a focusing screen. The screen moves to the position of the focus of the objective of the telescope and the reflector then moves into the line of sight at the time of photographing and both the reflector and screen move out of the field of vision of the eyepiece at the time of telescopic observation.

Another object of the present invention is to provide a telescope having a photographic camera wherein the movement of the focusing screen can be surely and quickly operated by pushing two buttons fitted to the outside of the photographic camera box.

A further object of the present invention is to provide a telescope having a photographic camera in which is provided a device whereby any elongation of the focal length as caused by the refractive index due to the thickness of the focusing screen is corrected so that correct focusing may be obtained in the camera.

The telescope having a photographic camera according to the present invention is characterized in that a focusing screen coinciding exactly with the surface of the film within the photographic camera and also with the focal plane of the eyepiece is provided in the focal plane of the objective and a device for moving said focusing screen to the position of the focus at the time of photographing and out of the field of vision of the objective at the time of telescopic observation is provided.

The movement of the focusing screen is attained preferably by an arrangement wherein a pinion meshing with a rack is provided on the frame of the focusing screen and a lever having two buttons is operatively connected to the forward end of the rack so that the focusing screen may be moved up and down by pushing the two buttons alternately. Alternatively, a grooved window is provided in the lens barrel and the focusing screen is provided in this window movable to right and left so that the focusing screen may be moved to right and left through a lever by the operation of a knob.

Further, the focusing screen may preferably have one surface thereof made spherical so as to make the resultant focus of the objective and eyepiece the same as when there is no focussing screen so that the elongation of the focal length as caused by the refractive index due to the thickness of the focusing screen may be corrected to secure correct focusing in the camera.

The present invention shall be explained in detail with reference to the accompanying drawings which illustrate an embodiment of the present invention.

In the accompanying drawings:

FIG. 1 is a longitudinally sectioned view of a telescope having a photographic camera according to the present invention;

FIGS. 2 and 3 are explanatory diagrams showing the relations between the focusing screen and the eyepiece;

FIG. 4 is a sectional view showing another example of setting the focusing screen.

As illustrated in FIG. 1, an annular body 3 having an objective 2 is rotatably fitted in the front part of a lens barrel and an annular body 5 having an eyepiece 4 is rotatably fitted in the rear part of the lens barrel 1. A camera 6 is fitted at upper part of the lens barrel 1 in suitable position between the objective 2 and the eyepiece 4.

In the focal plane $a$ of said objective 2 is provided a movable focusing screen 8 which can be set to coincide with the focal plane of the eyepiece 4.

In principle, the focusing screen 8 should be made as thin as possible. However, in case the position of the focus of the eyepiece 4 is extended to make the image unclear by the refractive index of the focusing screen 8 due to its thickness as shown in FIG. 2 more than when there is no focusing screen, one surface of the focusing screen 8 should be made spherical 8' as shown in FIG. 3 so that the resultant focus of the eyepiece 4 and focusing screen 8 may be the same as when there is no focusing screen as shown by the dotted line.

The focusing screen 8 is secured to a frame 9 which is secured to a rotatably horizontally placed shaft 11. To the shaft 11 is secured a pinion 13 meshing with a rack 12.

The rack 12 is so provided as to move to and fro through guides (not illustrated). A lever 15 pivoted to a shaft 14 is pivoted at 16 to the forward end of the rack 12. The lever 15 is provided with push buttons 17 and 18 above and below the shaft 14, respectively.

In the operation, if the push button 17 is pushed in the state shown in FIG. 1, lever 15 will rotate around the shaft 14 as a fulcrum and the rack 12 will retreat due to the rotation of the lever. As the rack 12 thus retreats, the pinion 13 will rotate and the focusing screen 8 will rotate in the direction indicated by the arrow and will move out of the field of vision of the eyepiece so as to allow telescopic observation.

If the button 18 is pushed, the focusing screen 8 will move from the position of the chain line to the position of the solid line through the lever 15, rack 12 and pinion 13. Then photographing can be carried out by correctly focusing by viewing the focusing screen 8 through the eyepiece 4. The photographing is accomplished by means of a reflector $b$ which is pivoted at one end and which is normally retracted out of the line of sight through eyepiece 4. The reflector is pivoted to enter the field of vision of the telescope only at the time of photographing and to be out of the field of vision at the time of telescopic observation in a manner similar to movement of the reflector in a one-eye reflex camera.

In FIG. 4, a window 20 having grooves 19 and 19' is made in the lens barrel 1 in front of the eyepiece 4. A frame 91 holding the focusing screen 8 is provided in the window 20 so as to be freely movable to right and left in the grooves 19 and 19'.

On a plate 21 provided with the window 20, a lever 23 having a knob 22 is pivoted to a shaft 24. A guide groove 25 is made at the forward end of the lever 23. In said guide groove 25 is fitted a pin 26 planted in the frame 91.

The knob 22 is provided to project out of the camera box 10. By moving the lever 23 to right or left with the shaft 24 as a fulcrum by holding the knob 22, the focusing screen 8 can be moved into or out of the field of vision of the eyepiece 4.

The present invention can also be applied to a binocular having a photographic camera.

What I claim is:

1. A telescope having a photographic camera, comprising a lens barrel, an objective lens disposed at one end of the barrel, an eyepiece disposed at the other end of the barrel, a support for a photographic plate disposed at one side of the barrel out of the line of sight through the objective lens and eyepiece, a movable focusing screen retractable out of said line of sight and movable into the focal plane of the objective and eyepiece, a reflector pivotable out of said line of sight for telescopic observation and movable into the line of sight to reflect an image to the photographic plate for photographing, a frame, said screen being mounted in said frame, a shaft carrying a pinion secured to the frame, a rack carried by said support meshed with said pinion, a lever pivotally carried by said support, and two buttons attached to said lever at points spaced oppositely from the pivot point thereof, said lever being connected to the rack for longitudinal movement thereof, whereby pushing one button moves the screen into the line of sight and pushing the other button retracts the screen out of the line of sight.

2. A telescope having a photographic camera, comprising a lens barrel, an objective lens disposed at one end of the barrel, an eyepiece disposed at the other end of the barrel, a support for a photographic plate disposed at one side of the barrel out of the line of sight through the objective lens and eyepiece, a movable focusing screen retractable out of said line of sight and movable into the focal plane of the objective and eyepiece, a reflector pivotable out of said line of sight for telescopic observation and movable into the line of sight to reflect an image to the photographic plate for photographing, a frame, said screen being mounted in said frame, said frame being movable in a grooved window formed in the lens barrel, and a lever connected to the frame and extending out of the barrel, said lever being pivotally mounted on the barrel so that pivoting of the lever moves the screen into and out of the line of sight.

3. A telescope having a photographic camera according to claim 2, wherein one surface of said screen is spherically curved to correct for displacement of the focal plane of the objective and eyepiece due to presence of the screen in the line of sight.

References Cited in the file of this patent

UNITED STATES PATENTS

| | | |
|---|---|---|
| 1,470,770 | Siedentopf | Oct. 16, 1923 |
| 1,986,522 | Owens | Jan. 1, 1935 |
| 2,614,454 | Steffen | Oct. 21, 1952 |
| 2,753,760 | Braymer | July 10, 1956 |